United States Patent [19]

Kawano et al.

[11] Patent Number: 5,677,745
[45] Date of Patent: Oct. 14, 1997

[54] LCD WITH ELECTROSTATIC DISCHARGE PROJECTIONS

[75] Inventors: Hideo Kawano; Akira Kubo, both of Himeji, Japan

[73] Assignee: Kabushiki Kaisha Toshiba, Kawasaki, Japan

[21] Appl. No.: 575,868

[22] Filed: Dec. 20, 1995

[30] Foreign Application Priority Data

Dec. 21, 1994 [JP] Japan .................. 6-318898

[51] Int. Cl.$^6$ .................. G02F 1/1343; G02F 1/136
[52] U.S. Cl. .................. 349/42; 349/139; 349/39
[58] Field of Search .................. 359/54, 59, 81; 257/59; 349/143, 42, 39, 139

[56] References Cited

U.S. PATENT DOCUMENTS

| | | | |
|---|---|---|---|
| 5,151,688 | 9/1992 | Tanaka et al. | 359/59 |
| 5,212,573 | 5/1993 | Yamazaki | 359/54 |
| 5,220,443 | 6/1993 | Noguchi | 359/87 |
| 5,233,448 | 8/1993 | Wu | 359/59 |
| 5,313,319 | 5/1994 | Salisbury | 359/54 |
| 5,323,254 | 6/1994 | Pitt | 359/54 |
| 5,327,267 | 7/1994 | Aoki et al. | 359/59 |
| 5,442,469 | 8/1995 | Pitt | 359/87 |
| 5,508,591 | 4/1996 | Kanemori et al. | 359/59 |
| 5,546,204 | 8/1996 | Ellis | 359/59 |

FOREIGN PATENT DOCUMENTS 6-18924  1/1994  Japan .

Primary Examiner—William L. Sikes
Assistant Examiner—Toan Ton
Attorney, Agent, or Firm—Cushman Darby & Cushman IP Group of Pillsbury Madison & Sutro LLP

[57] ABSTRACT

Projections are formed of a layer at locations at which no conductive pattern such as a signal line formed of another layer is provided, a scanning line and an storage capacitor line can be prevented from being short-circuited via the portion of an insulating film damaged by discharge of static electricity.

14 Claims, 6 Drawing Sheets

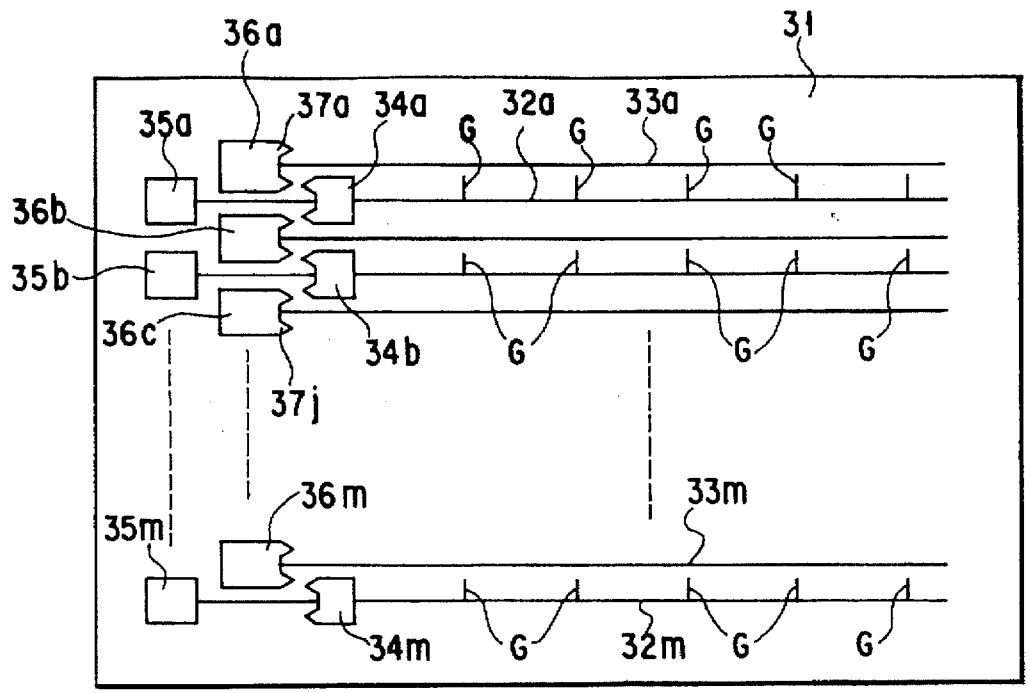
F I G. 8
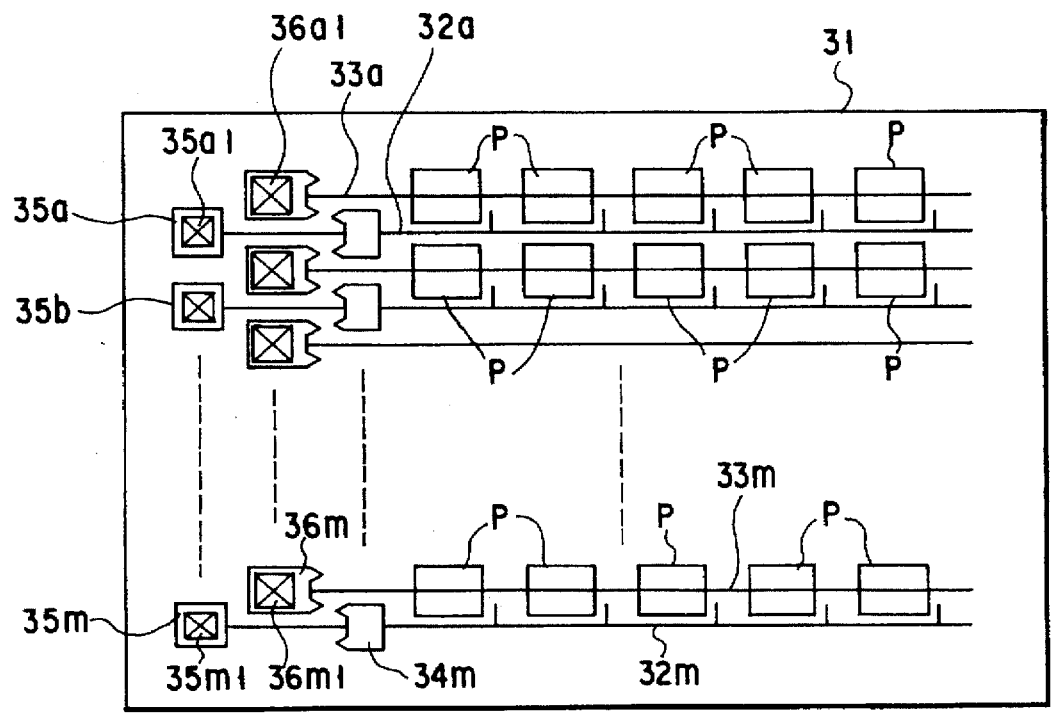
F I G. 9

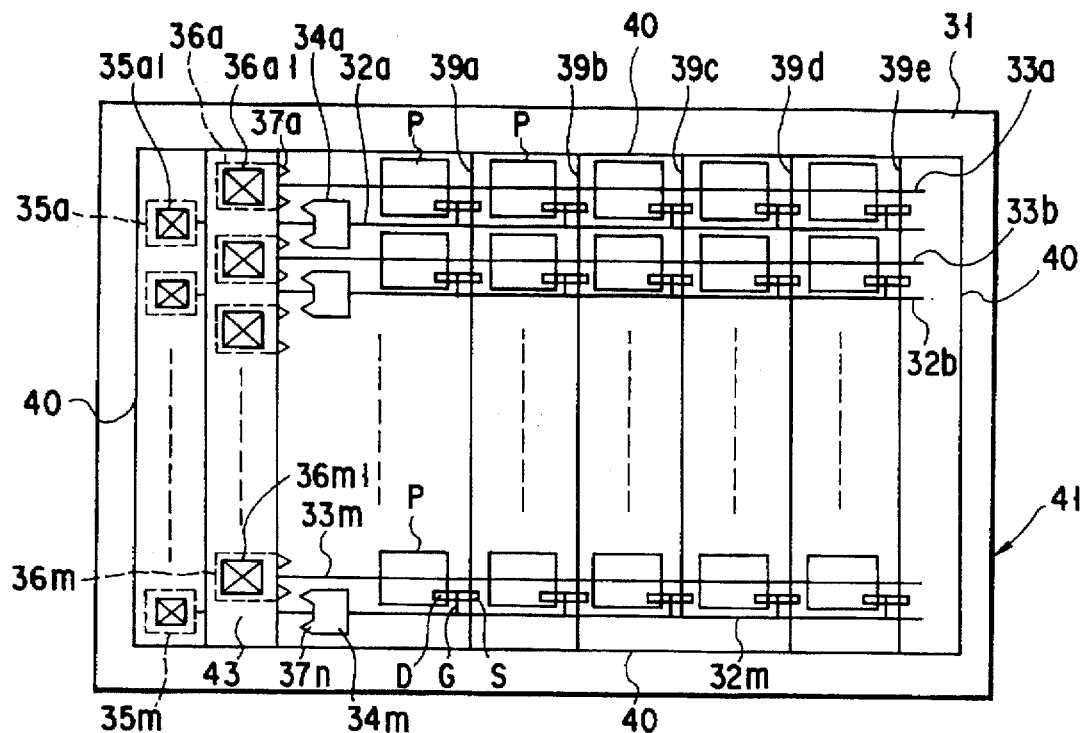
F I G. 10
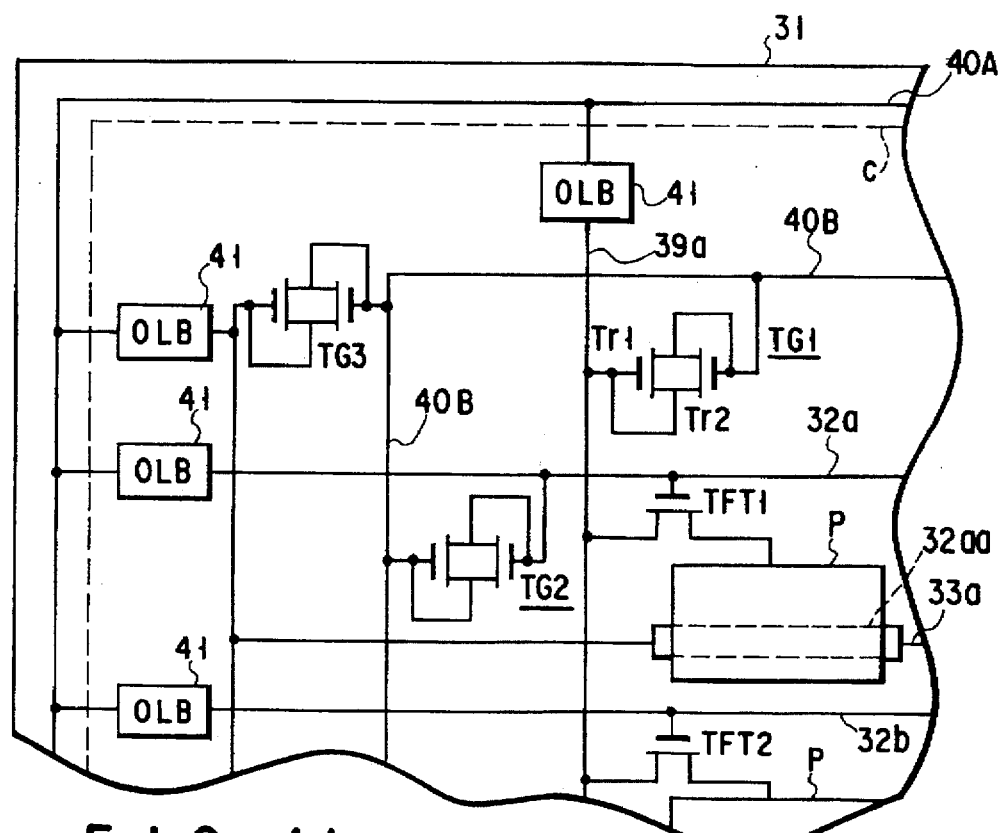
F I G. 11

LCD WITH ELECTROSTATIC DISCHARGE PROJECTIONS

BACKGROUND OF THE INVENTION

1. Field of the Invention

This invention relates to a display apparatus which has a fine wiring structure like a scanning line or signal line structure employed in an active matrix type liquid crystal display apparatus.

2. Description of the Related Art

In the field of display apparatuses, and in particular, in the field of liquid crystal display apparatuses, display apparatuses of high capacity and high density, which are directed to TV display, graphic display, etc., have been actively developed and put to practice.

More specifically, display apparatuses with active matrix type liquid crystal display panels using metal-insulator-metal (MIM) diodes or thin film transistors (TFTs) as switching elements have been developed to realize finer and higher-functional image display, and put to practice, in addition to simple matrix type liquid crystal display apparatuses in which a voltage is applied, in a time-sharing driving method, between pixel-constituting electrodes opposed to each other with a liquid crystal layer interposed therebetween, to drive the liquid crystal layer and display data thereon.

The active matrix type liquid crystal display apparatuses are excellent in responsiveness to image signals, and can display high-contrast and high-quality images free from cross talk. By virtue of these properties, the apparatuses are now widely used as TV or OA (Office Automation) display apparatuses. In these apparatuses, the pitch of pixels is as fine as about 100 µm. Further, a display apparatus which incorporates as many as 1,000,000 pixels has also been developed.

To widely spread the use of such active matrix type liquid crystal display apparatuses, it is necessary to enhance the yield of products in order to reduce the price.

There are some measures to enhance the yield of products. A main one is to reduce the ratio of display defects due to dielectric breakdown of an insulating layer between electrodes caused by static electricity during manufacture. To prevent the dielectric breakdown by static electricity, various steps have been taken so far.

A conventional active matrix type liquid crystal display apparatus, which is equipped, for example, with switching elements consisting of thin film transistors, employs one of the measures for preventing the dielectric breakdown. This apparatus employs the step of making conductive all scanning lines, storage capacitor lines and signal lines by providing a conductive ring pattern, called a "short ring", at a peripheral portion of the array plate.

FIG. 1 is a schematic plan view, showing a conventional TFT array plate in which a short ring is formed during manufacture. As is shown in FIG. 1, a plurality of scanning lines 11 are formed parallel to each other on a glass substrate 10, and a plurality of storage capacitor lines 12 are formed parallel to the scanning lines such that each of the storage capacitor lines is interposed between a corresponding pair of the adjacent scanning lines. On the storage capacitor lines 12, a plurality of pixel electrodes 13 are arranged in rows and columns, electrically isolated from the capacitor lines 12. A plurality of signal lines 14 are formed perpendicular to the scanning lines 11 and the storage capacitor lines 12, isolated therefrom. A scanning line inspecting electrode 15 and a power supply electrode 16 are connected to each scanning line 11, and a storage capacitor line inspecting electrode 17 is connected to each storage capacitor line 12. The scanning line 11, the storage capacitor line 12 and the signal lines 14 are electrically connected to each other by means of a short ring 18 formed at a peripheral portion of the array plate.

Making conductive all the scanning lines 11, the storage capacitor lines 12 and the signal lines 14 by means of the short ring 18 during manufacture can prevent the TFT array plate of the active matrix type liquid crystal display apparatus from having an occurrence of a large potential difference between wires and accordingly prevent dielectric breakdown due to static electricity, even if the substrate is charged with static electricity after the short ring 18 is formed.

Actually, however, it is highly possible that static electricity is accumulated before the short ring is formed. In such a case, a potential difference occurs between the wires, with the result that a wire structure and/or insulating films formed on the TFT substrate before the short ring is formed will be destroyed.

In a process step before the forming of the short ring 18 as shown in FIG. 1, for example, the inspecting electrodes 15 and 17 are formed such that they are connected to the scanning lines 11 and the storage capacitor lines 12. Thereafter, a resist is coated on the substrate 10 for photo etching of other patterns, and then the substrate 10 coated with the resist is heated on a flat stage for evaporating a solvent of the resist. After the heating treatment, the TFT substrate 10 is transferred to a place for performing the next treatment, by a transfer belt 22 with a plurality of transfer rollers 21 as shown in FIG. 2. During transfer, the substrate 10 is kept out of contact with the transfer belt 21 by static electricity as high, for example, as several thousands volts applied therebetween. The transfer position of the substrate 10 is adjusted by metal arms 23 attached to the transfer belt 22 as shown in FIG. 2. It is possible that negative static electricity accumulated at the substrate 10 abruptly moves to the metal arms 23 when the substrate has contacted the arms, and that a wire structure and/or insulating films of the substrate 10 will be destroyed.

More specifically, where, as is shown in FIG. 3, static electricity of several thousands volts is accumulated at a part 24 of the TFT substrate 10 and the metal arm 23 is connected to a ground level, the electricity abruptly moves between the part 24 and the metal arm 23.

At this time, static electricity accumulated at a scanning line 11a or an storage capacitor line 12a, located near the charged part 24 of the substrate 10, passes a scanning line 11b located between the line 11a or 12a and the metal arm 23, and quickly moves in a discharge state through an insulating film 25 such as an interlayer insulating film, or through a thin film semiconductor layer 26. FIG. 3 further shows the position of a signal line 14a to be formed in the next process.

The above discharge causes discharge between the scanning line 11a and the metal arm 23, thereby forming a damaged portion 27 like a pin hole, etc. in the insulating film 25 and the thin film semiconductor layer 26 provided on the scanning line 11a, as is shown in FIG. 4A. If the signal line 14a is formed on the resultant structure as shown in FIG. 4B, it is short-circuited with the scanning line 11a through the damaged portion 27. As a result, a display defect such as a line defect occurs on that pixel line of a completed display panel, which corresponds to the short-circuited portion.

The short ring must be cut out after the completion of the array substrate since it prevents the normal display operations. Further, after the removal of the short ring, occurrence of a display defect due to dielectric breakdown caused by static electricity cannot be prevented.

In addition, the dielectric breakdown due to static electricity can be prevented by forming, instead of using the short ring, the scanning line and the signal lines such that adjacent portions of their input terminals are formed as coupling capacitors only during manufacturing so as to allow static electricity accumulated at the lines to be discharged. However, also in this case, the coupling capacitor portions must be removed, like the short ring, after the completion of the array substrate since they prevent the normal display operations. The cut treatment not only increases the manufacturing cost, but also may cause a display defect due to dielectric breakdown by static electricity.

SUMMARY OF THE INVENTION

It is the object of the invention to provide a highly reliable and cost-effective active matrix type liquid crystal display apparatus, which is free from dielectric breakdown due to accumulated static electricity even before a short ring is formed and after the short ring is cut out, and hence which contributes to reduction of the ratio of defective products and hence to increase the yield of products.

According to a first aspect of the invention, there is provided a display apparatus comprising:

- a first electrode plate including a plurality of first electrode lines arranged substantially parallel to each other on a first insulating substrate, and a plurality of pixel electrodes arranged in the form of a matrix and electrically coupled to the first electrode lines via respective switch elements;
- a second electrode plate including an electrode formed on a second insulating substrate and opposed to the pixel electrodes; and
- a light modulating layer held between the pixel electrodes and electrodes opposed thereto;
- wherein at least one of each adjacent pair of the first electrode lines has at least one discharge projection extending toward the other of the adjacent pair.

According to a second aspect of the invention, there is provided a display apparatus comprising:

- a pixel electrode array plate having a plurality of scanning lines and storage capacitor lines arranged alternately and parallel to each other on a first insulating substrate, signal lines formed of a layer differing from a layer which constitutes the scanning lines and the storage capacitor lines, and a pixel electrode formed at each intersection of the scanning lines and the signal lines, an insulating film being interposed between the layer of the signal lines and the layer of the scanning lines and the storage capacitor lines, the signal lines intersecting the scanning lines and the storage capacitor lines;
- a plate opposed to the pixel electrode array plate and having a second insulating substrate with an electrode formed thereon;
- a light modulating layer held between the pixel electrode array substrate and the opposed substrate, wherein:
- each of the scanning lines and the storage capacitor lines having a projection of an acute-angled plan pattern formed at a location at which the scanning lines and the signal lines do not intersect each other, the projections of each adjacent pair of the scanning lines and storage capacitor lines being opposed to each other for allowing discharge of electricity accumulated at the scanning lines and the storage capacitor lines in a state in which the scanning lines and the storage capacitor lines do not contact each other.

Preferably, in the display apparatus, the projections extend from the scanning lines and the storage capacitor lines to scanning line connecting pads and storage capacitor line connecting pads formed outside a region in which the pixel electrodes are arranged, or to scanning line inspecting pads and storage capacitor line inspecting pads connected to the scanning line connecting pads and the storage capacitor line connecting pads, respectively.

More preferably, the projections are constituted by portions of the scanning line connecting pads and the storage capacitor line connecting pads, the portions of each adjacent pair of the scanning line connecting pads and the storage capacitor line connecting pads being opposed to each other for allowing discharge of electricity accumulated at the scanning lines and the storage capacitor lines in a state in which the scanning lines and the storage capacitor lines do not contact each other.

Also preferably, in the display apparatus, a tip portion of each of the projections has an acute angle of 30°–90°, and the distance between each adjacent pair of the projections is set to 4 μm–20 μm.

According to a third aspect of the invention, there is provided a method for manufacturing a display apparatus comprising the steps of:

- forming a pixel electrode array plate by forming a pixel electrode array substrate having a plurality of scanning lines and storage capacitor lines alternately arranged on a first insulating substrate, forming signal lines of a layer differing from a layer which constitutes the scanning lines and the storage capacitor lines, with an insulating film interposed between the layers, such that the signal lines intersect the scanning lines and the storage capacitor lines, and forming a pixel electrode at each intersection of the scanning lines and the signal lines;
- opposing a plate with a second insulating substrate having an electrode formed thereon, to the pixel electrode array plate;
- holding a light modulating layer between the pixel electrode array plate and the opposed plate; and
- making each of the scanning lines and the storage capacitor lines include a projection of an acute-angled plan pattern formed at a location at which the scanning lines and the signal lines do not intersect each other, the projections of each adjacent pair of the scanning lines and storage capacitor lines being opposed to each other for allowing discharge of electricity accumulated at the scanning lines and the storage capacitor lines in a state in which the scanning lines and the storage capacitor lines do not contact each other.

Preferably, in the method, the projections extend from the scanning lines and the storage capacitor lines to scanning line connecting pads and storage capacitor line connecting pads formed outside a region in which the pixel electrodes are arranged, or to scanning line inspecting pads and storage capacitor line inspecting pads connected to the scanning line connecting pads and the storage capacitor line connecting pads, respectively.

In a conductor, static electricity generally concentrates in that portion of the conductor which is located at the boundary between the conductor and the outside and has a small curvature, or an acute-angled portion of the conductor if it is flat. Therefore, in the case of the present invention, static electricity concentrates at the projections of the scanning lines and the storage capacitor lines. As a result, a strong magnetic field is created between those projections of each adjacent pair of the scanning lines and the storage capacitor lines, which are opposed to each other and out of contact with each other, and static electricity can easily be discharged therebetween.

Although at the time of a rubbing orientation treatment of an orientation film, for example, the scanning lines and the storage capacitor lines, which are formed of the same layer, are charged with static electricity, the static electricity is immediately discharged between the projections before it is abruptly moved to the hand of an operator or a transfer metal arm when the hand or the metal arm has contacted the TFT array plate during transfer of the same. Thus, discharge is prevented at the other portions of the array plate. Moreover, since the projections are formed at locations at which no conductive pattern formed of another layer is provided, there is no possibility of occurrence of short-circuiting between the conductive pattern and the scanning lines and the storage capacitor lines, caused by a damaged portion of an insulating film, etc. due to discharge of static electricity.

Accordingly, occurrence of a defective display apparatus due to interlayer short-circuiting resulting from dielectric breakdown caused by static electricity can be prevented.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIG. 8 is a schematic plan view showing the state of the TFT array plate assumed in a process step of manufacturing the liquid crystal display apparatus of the embodiment;

FIG. 9 is a schematic plan view showing the state of the TFT array plate assumed in another process step of manufacturing the liquid crystal display apparatus of the embodiment;

FIG. 10 is a schematic plan view showing that state of the TFT array plate which is assumed, before a short ring is cut out in a further process step of manufacturing the liquid crystal display apparatus of the embodiment; and FIG. 11 is a circuit diagram showing the relationship in arrangement between the short ring and circuit elements formed on the TFT array plate obtained in the process step of FIG. 10.

DETAILED DESCRIPTION OF THE PREFERRED EMBODIMENTS

A display apparatus according to the invention which is applied to an active matrix type liquid crystal display apparatus, will be explained in detail with reference to the accompanying drawings.

Figure 1:
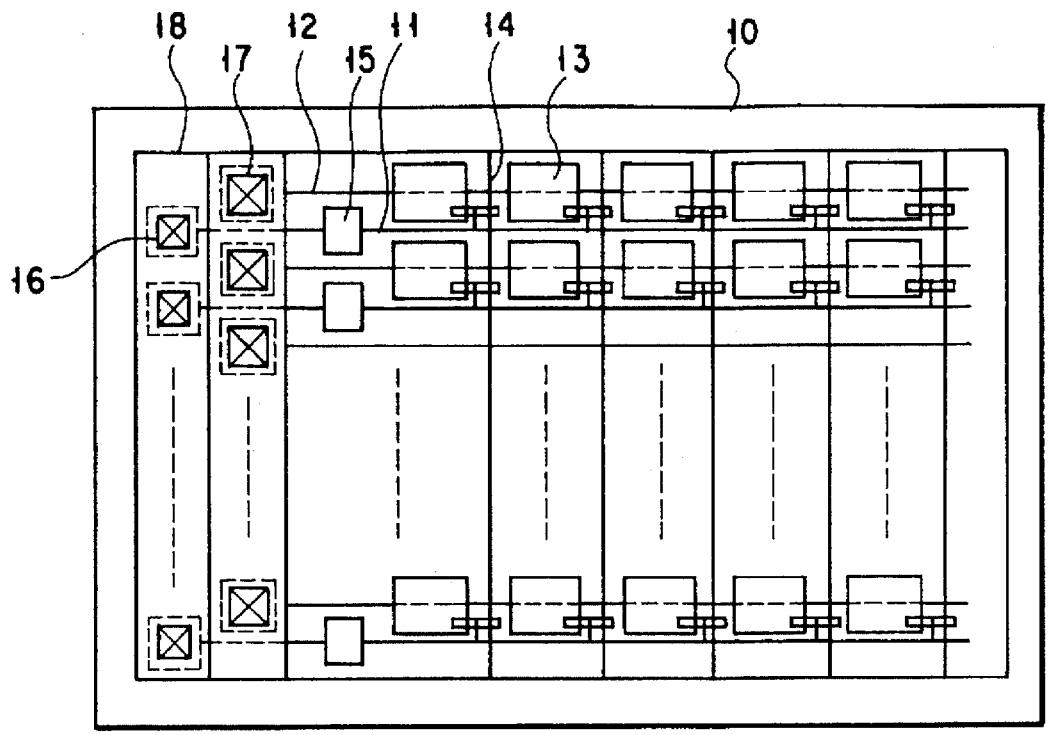
FIG. 1 is a schematic plan view showing a TFT array plate formed in a conventional manufacturing process of a liquid crystal display apparatus using a short ring.
Figure 2:
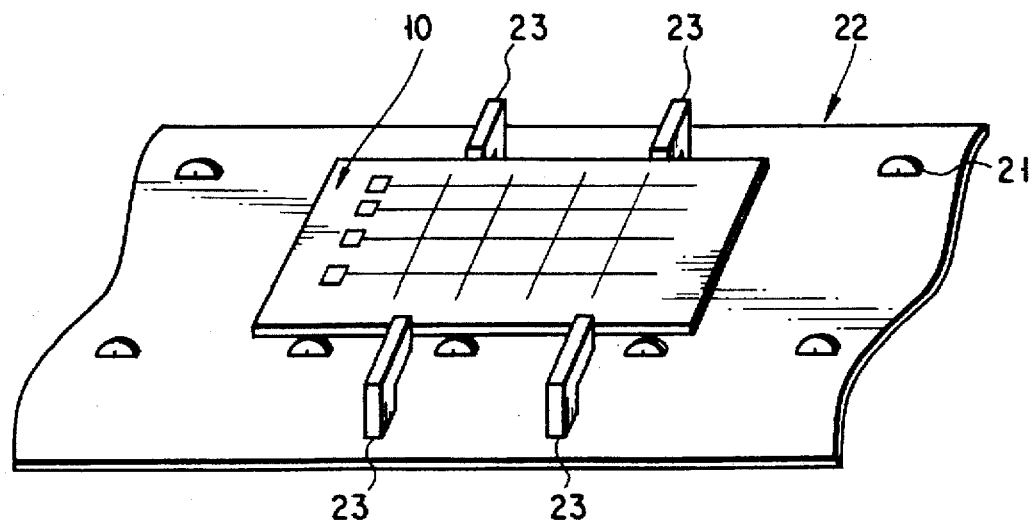
FIG. 2 is a perspective view showing the state of adjusting the position of the TFT array plate by means of metal arms on a transfer system used in the manufacturing process of the liquid crystal display apparatus.
Figure 3:
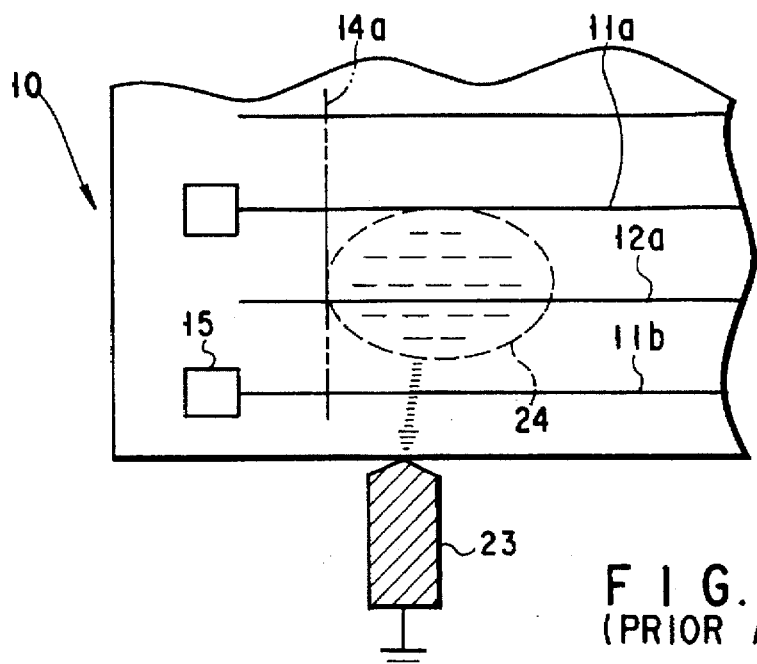
FIG. 3 is a schematic view useful in explaining a state in which static electricity accumulated at the TFT array plate abruptly moves to one of the metal arms when the substrate has contacted the metal arm.
Figure 4A:
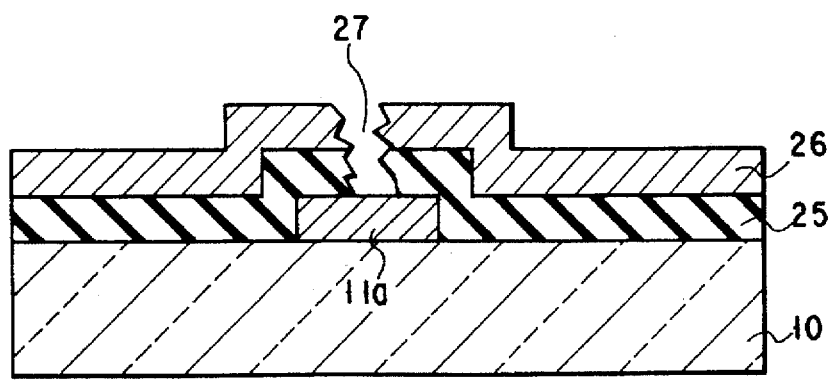
FIG. 4A is a sectional view showing a defect in the form of a pin hole which is caused by dielectric breakdown of an insulating film due to discharge of the static electricity.
Figure 4B:
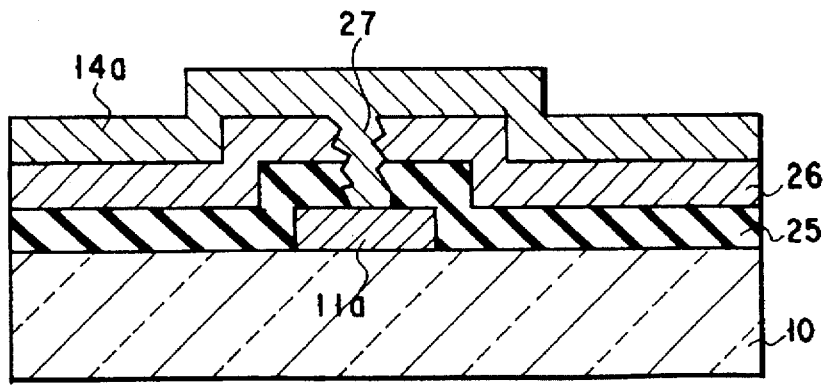
FIG. 4B is a sectional view showing a state in which a scanning line and a signal line are short-circuited with each other through the pin hole defect.
Figure 5:
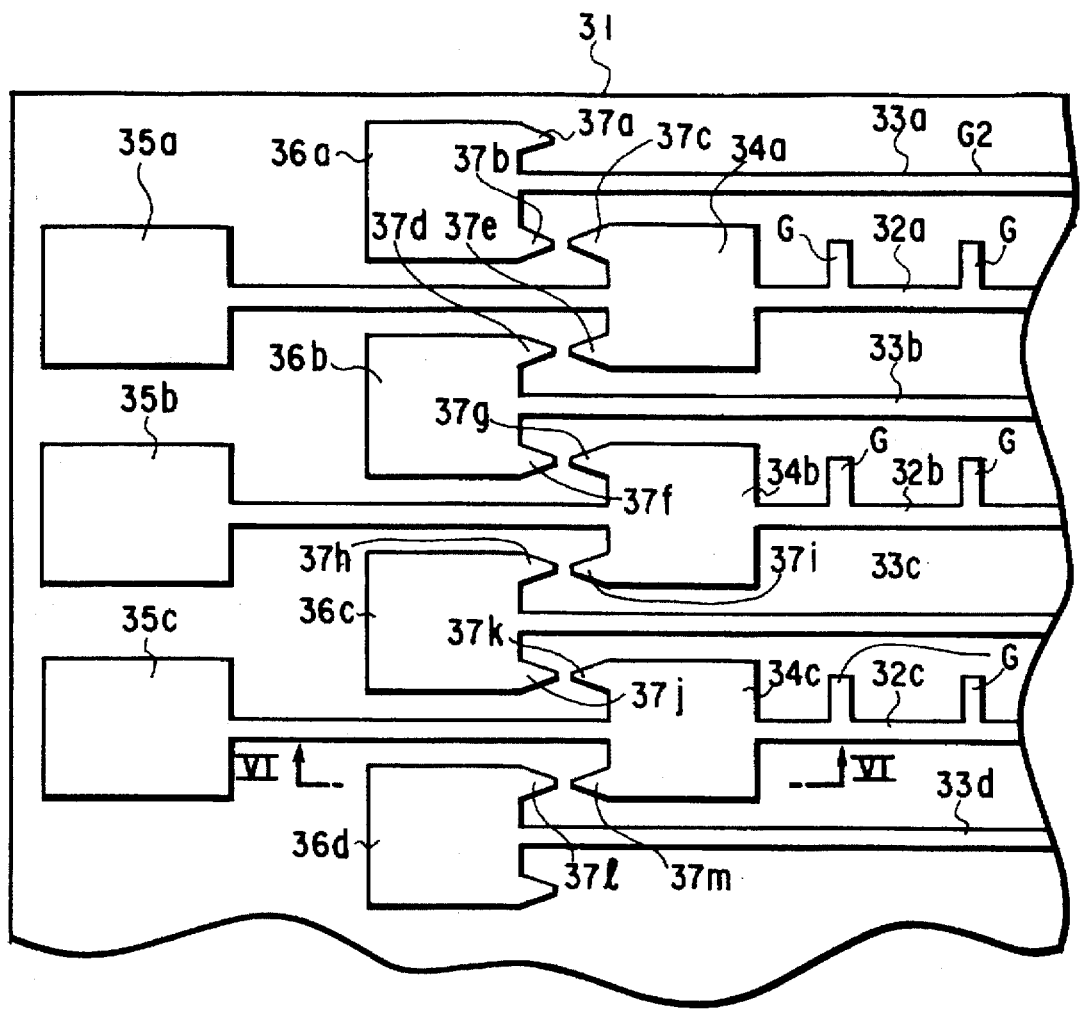
FIG. 5 is an enlarged plan view of an active matrix type liquid crystal display apparatus according to the present invention showing discharge projections formed on a TFT array plate employed in the display apparatus.

FIG. 5 is a plan view showing an end portion of a TFT array plate employed in the active matrix type liquid crystal display apparatus, and showing only scanning lines and storage capacitor lines.

As is shown in FIG. 5, a plurality of scanning lines 32a, 32b, 32c, ... and storage capacitor lines 33a, 33b, 33c, 33d, ... are arranged alternately and parallel to each other on a transparent insulating substrate 31 such as a glass substrate. Scanning line inspecting pads 34a, 34b, 34c, ... are provided at the scanning lines 32a, 32b, 32c, ..., respectively, and scanning line connecting pads 35a, 35b, 35c, ... are provided at end portions of the scanning lines 32a, 32b, 32c, ..., respectively. Auxiliary capacitive line connecting/inspecting pads 36a, 36b, 36c, 36d, ... are provided at end portions of the storage capacitor lines 33a, 33b, 33c, 33d, ....

Figure 6:
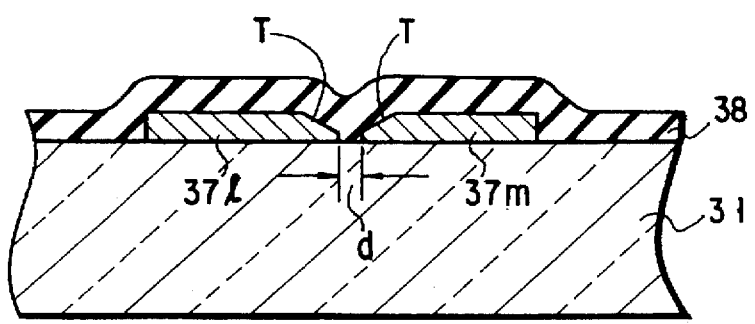
FIG. 6 is a sectional view of one of the discharge projections shown in FIG. 5.

The scanning line inspecting pads 34a, 34b, 34c, ... and the storage capacitor line connecting/inspecting pads 36a, 36b, 36c, ... have projections 37a–37j of a substantially triangular shape in plan with an acute angle of 60°. The projections of each adjacent pair of the pads arranged alternately are opposed to each other with a predetermined distance interposed therebetween. As is shown in FIG. 6, the distance d between the projection 37l of the storage capacitor line connecting/inspecting pad 36d and the projection 37m of the scanning line inspecting pad 34c is set to about 1–3 μm. Further, each of the projections 37l and 37m has a tapered tip portion T. As will be explained later, the tapered tip portion T can easily be formed in an etching process. Thus, the opposed areas of the projections 37l and 37m are small enough to ignore the formation of the coupling capacitor thereof. The distance d is set to such a value as allows discharge of static electricity of several thousands volts, but prohibits discharge of an operating voltage of several tens volts applied to a liquid crystal display apparatus after it is completed. After the electrode structure shown in FIG. 5 is completed, it is coated with an insulating layer 38 without a connecting pad.

Thereafter, signal lines are formed such that they intersect the scanning lines 32a, 32b, 32c, ... and the auxiliary capacitive lines 33a, 33b, 33c, 33d, ... with an insulating film interposed therebetween, as will be explained later in more detail. Since the projections 37a–37m are sharpened like a lightening conductor, static electricity can be concentrated and discharged more easily at the tip portions t of the projections than the other portions t of the lines. In other words, since static electricity of several thousands volts accumulated in the electrodes is discharged from the tip portions t of the projections, the other portions of the scanning lines 32a, 32b, 32c, . . . and the storage capacitor lines 33a, 33b, 33c, 33d, . . . , which will intersect signal lines (not shown) formed later in an image display region with an insulating film interposed therebetween, allows static electricity to be not concentrated and discharged. In the other portions or main portions of the lines 32 and 33, such as image display portions corresponding to gate electrodes G of the scanning line 32a, there is no possibility of abrupt discharge of static electricity through an insulating film to signal lines located above or below the gate electrodes G. Accordingly, the insulating film formed within the image display area can be very effectively prevented from being damaged by such abrupt discharge of static electricity (specifically, a pin hole or the like will not be formed in the insulating film).

Furthermore, in the process for manufacturing the TFT array plate, some portions of signal lines are formed before a short ring is formed. In other words, there is a stage in which the scanning lines 32 and the storage capacitor lines 33 are not electrically connected by the short ring. In the conventional case, static electricity locally concentrates between the scanning lines 32, the storage capacitor lines 33 and the signal lines in the aforementioned stage, the concentrated static electricity will be abruptly discharged through these lines and the insulating film therebetween will be damaged. However, since in the above-described embodiment of the invention, the static electricity can be discharged between the projections 37a–37m, a pin hole or the like can be prevented from being formed in the insulating film even in the stage before the short ring is formed.

As explained above, the projections 37a–37m causes highly concentrated static electricity of several thousands volts to be effectively discharged, and does not allow discharge of a driving power of 20–30 V and several mA at highest, which is generally used to drive the drive the liquid crystal display apparatus. Moreover, since almost no capacitive coupling occurs between the projections 37a–37m, it is not necessary to remove the projections from the TFT array plate after the completion of the liquid crystal display apparatus. Therefore, products of high performance can be manufactured at a high yield. Further, the remaining projections 37a–37m can prevent a failure in the display apparatus due to discharge of static electricity even after the apparatus is completed.

The process for manufacturing the TFT array plate for the active matrix type liquid crystal display apparatus, which has the electrode structure shown in FIGS. 5 and 6, will now be explained in detail with reference to the flowchart of FIG. 7 and the plan views of FIGS. 8–10.

Figure 7:
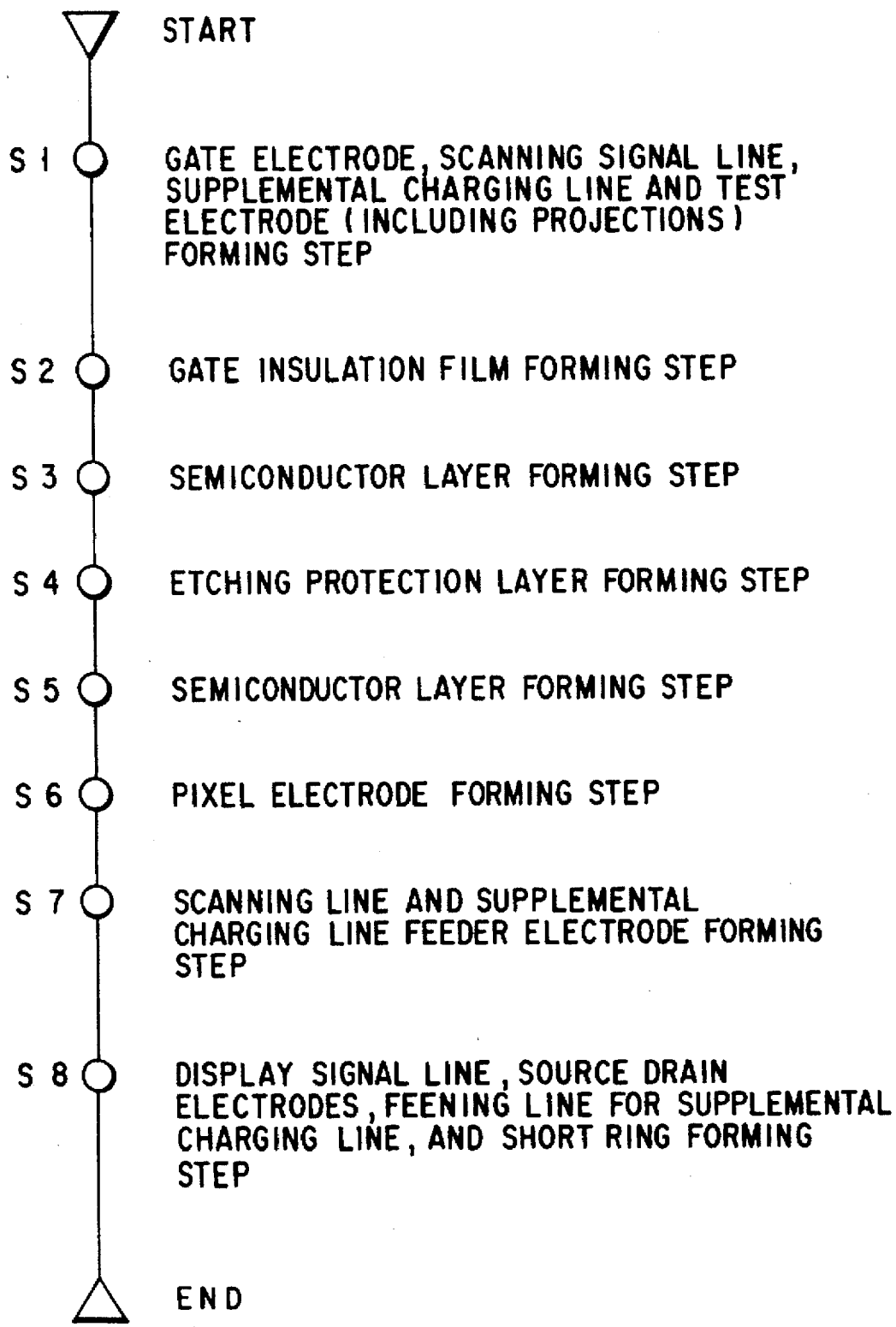
FIG. 7 is a flowchart useful in explaining a process for manufacturing the liquid crystal display apparatus according to the embodiment of FIG. 5.

Referring first to FIG. 7, the overall steps of the process will be explained. In a first step S1, gate electrodes, scanning signal lines, storage capacitor lines and electrodes including projections for inspecting the lines are formed on a thin glass substrate having a thickness of, for example, 0.7 mm. The electrode structure formed in the step S1 is shown in FIGS. 5 and 6, while the overall structure of the TFT array plate is shown in FIG. 8.

Specifically, in the step S1, a Mo—W (molybdenum-tungsten) alloy film with a thickness of 300 nm is formed on a glass insulating substrate 31 by sputtering, and then patterned by photoetching, thereby forming the scanning lines 32a–32m, the gate electrodes G, the storage capacitor lines 33a–33m, scanning line inspecting electrodes 34a–34m and storage capacitor line inspecting electrodes 36a–36m.

In a step S2, open and short circuit inspections of the scanning lines 32a–32m and the storage capacitor lines 34a–34m of a semifinished product as shown in FIG. 8 are performed, and then an SiOx gate insulating film with a thickness of 400 nm is deposited on the overall surface of the substrate 31 by CVD (Chemical Vapor Deposition). In a step S3, a hydrogenated amorphous silicon (a-Si:H) film with a thickness of 50 nm, which is a semiconductor layer serving as a channel region of the TFT, is deposited on the overall resultant structure by the CVD. In a step S4, a silicon nitride (SiNx) etching protection film with a thickness of 200 nm is deposited by the CVD on the overall resultant structure, thereby etching only the etching protection film to a predetermined pattern by photoetching.

Subsequently, in a step S5, an n$^+$-type a-Si:H film with a thickness of 50 nm is deposited by the CVD, thereby patterning the n$^+$-type a-Si:H film and the a-Si:H film below the former. In a step S6, an indium tin oxide (ITO) film with a thickness of 100 nm is formed by sputtering, and then etched by photoetching to form pixel electrodes P at locations corresponding to the gate electrodes G, as shown in FIG. 9.

In a step S7, power supply electrodes 35al–35ml and 36al–36ml are provided at the scanning line connecting pads 35a–35m and the storage capacitor line connecting pads 36a–36m, respectively.

In a step S8, a plurality of signal lines 39a, 39b, 39c, 39d, 39e, . . . are formed, as shown in FIG. 10, perpendicular to the scanning lines 32a–32m and the storage capacitor lines 34a–34m and at locations corresponding to the pixel electrodes P, such that each column of the gate electrodes G is held between a corresponding adjacent pair of the signal lines 39a, 39b, 39c, 39d, 39e, . . . At this time, a short ring 40 is formed on a peripheral portion of the glass substrate 31, surrounding all the lines and electrodes. Further, as shown in FIG. 10, a drain electrode D is formed between each gate electrode G and a corresponding pixel electrode P to connect them to each other, while a source electrode S is formed between each gate electrode G and a corresponding signal line 39 to connect them to each other. The short ring 40 is electrically connected to the signal lines 39a–39e.

Lastly, an orientation film (not shown) is coated on the overall resultant structure, thereby completing a TFT array plate 41.

Another plate (not shown), which is to be opposed to the TFT array plate 41 with a space interposed therebetween for receiving a liquid crystal, is made by forming, on an insulating glass substrate, an ITO film with a thickness of 100 nm which serves as a common electrode. This plate is adhered to the TFT array plate 41 by means of a sealing/adhering agent coated on peripheral portions of the plates, and then a liquid crystal is injected between the adhered plates. Thus, a main part of the active matrix type liquid crystal display apparatus is completed.

As described above, each adjacent pair of all the scanning lines 32a–32m and the storage capacitor lines 33a–33m are opposed to each other via their projections for allowing discharge, and the signal lines 39a–39e are electrically connected to each other by means of the short ring 40. As a result, even if the semifinished TFT array plate is charged with static electricity before the short ring is formed, occurrence of a high potential difference between wire layers employed therein can be prevented. In addition, even if the array plate is charged with static electricity after the short ring is removed, dielectric breakdown due to discharge of static electricity does not occur since the static electricity is discharged between the projections.

FIG. 11 shows a modification of the embodiment shown in FIG. 10. In FIG. 11, elements similar to those in FIG. 10 are denoted by corresponding reference numerals for facilitating the explanation.

As is shown in FIG. 11, two short rings 40A and 40B are formed on the substrate 31 with a predetermined space interposed therebetween. The inner short ring 40B corresponds to the short ring 40 in FIG. 10. The signal line 39a is connected to the short ring 40B via a transfer gate TG1 constituted by two transistors Tr1 and Tr2. Similarly, the scanning line 32a is connected to the short ring 40B via a transfer gate TG2 constituted by two transistors Tr1 and Tr2, and the storage capacitor line 33a is connected to the short ring 40B via a transfer gate TG3.

The scanning line 32a is connected to the gate of a switching transistor TFT1. Further, the switching transistor TFT1 has its source connected to the signal line 39a and its drain connected to the pixel electrode P. The storage capacitor line 33a has a wide capacitance forming portion 33a located below the pixel electrode P. The scanning lines 32a and 32b, the storage capacitor line 33a and the signal line 39a are connected to outer lead bonding pads OLB 41 which is located outside the inner short ring 40B. The other terminal of each of the OLBs 41 is connected the outer short ring 40A.

Each of the transfer gates TG1, TG2 and TG3 is designed such that it becomes conductive when a voltage of several hundreds volts is applied thereto, and does not become conductive when an operation voltage as low as several tens volts is applied thereto. When highly intensed static electricity occurs during manufacturing, the transfer gates allow the static electricity to flow to the short ring 40B. It is no problem to keep the transfer gates TG1, TG2 and TG3 left in a product after it is completed. The outer short ring 40A, however, is removed by cutting the glass substrate 31 along the broken line C in the last stage of manufacturing.

It is a matter of course that the projections 37a–37m may be arranged between the scanning line connecting pads 35a–35m formed on peripheral portions of the substrate 31 and the storage capacitor line connecting pads 36a–36m, so as to be connected to a driving circuit. Alternatively, each of the scanning line connecting pads 35a–35m and the storage capacitor line connecting pads 36a–36m may be modified such that it has acute-angled corner portions like the projections 37a–37m, and that the distance between the adjacent corner portions is set to an appropriate value of several microns as aforementioned.

In FIG. 10, the storage capacitor line connecting pads 36a–36m are connected to a connecting line 43 through contact holes 36a1–36m1 formed in the insulating film.

The display apparatus of the invention can be manufactured by only slightly changing the conventional manufacturing process, i.e. by only patterning each projection to a skillful structure as described above. Thus, the display apparatus can be manufactured extremely easily.

It is desirable to pattern the tip tapered portion T of the projection to a rectangular shape with an acute angle of 30°–90°, and to set the distance between each adjacent pair of the projections to 1–20 µm.

Although in the above-described embodiments, the technique of the invention is applied to the liquid crystal display apparatus, it is a matter of course that the technique is not limited to the apparatus. For example, the invention is particularly applicable to a display apparatus, such as an EL display or a plasma display, in which scanning lines intersect signal lines with an insulating film interposed therebetween, and dielectric breakdown due to accumulated static electricity may well occur.

As explained above in detail, the invention enables a highly reliable display apparatus such as an active matrix type liquid crystal display apparatus to be manufactured at a low cost and a high yield, since the invention can prevent dielectric breakdown due to accumulated static electricity even before the short ring is formed and after the short ring is removed, thereby reducing the ratio of defective products and hence enhancing the yield of products.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A display apparatus comprising:
   a first electrode plate including a plurality of first electrode lines arranged substantially parallel to each other on a first insulating substrate, and a plurality of pixel electrodes arranged in the form of a matrix and electrically coupled to the first electrode lines via respective switch elements;
   a second electrode plate including a second electrode formed on a second insulating substrate and opposed to the pixel electrodes; and
   a light modulating layer held between the pixel electrodes and the second electrode opposed thereto;
   wherein each of the first electrode lines is electrically connected to a pad and at least one of each adjacent pair of the first electrode lines has a pad with at least one discharge projection extending toward at least one discharge projection of a pad of the other of the adjacent pair of the first electrode lines.

2. The display apparatus according to claim 1, further comprising:
   a plurality of second electrode lines arranged in a direction substantially perpendicular to the direction of the arrangement of the first electrode lines; and
   an insulating film interposed between the second electrode lines and the first electrode lines.

3. The display apparatus according to claim 2, wherein:
   the first electrode lines include scanning lines; and
   the second electrode lines include signal lines.

4. The display apparatus according to claim 3, wherein:
   the first electrode lines also include storage capacitor lines, the scanning lines and the storage capacitor lines being alternately arranged.

5. The display apparatus according to claim 2, wherein:
   the first electrode lines include signal lines; and
   the second electrode lines include scanning lines.

6. A display apparatus comprising:
   a pixel electrode array plate having a plurality of scanning lines and a plurality of storage capacitor lines arranged alternately and parallel to each other on a first insulating substrate, a plurality of signal lines formed of a layer differing from a layer which constitutes the scanning lines and the storage capacitor lines, and a pixel electrode formed at each intersection of the scanning lines and the signal lines, an insulating film being interposed between the layer of the signal lines and the layer of the scanning lines and the storage capacitor lines, the signal lines intersecting the scanning lines and the storage capacitor lines;

a plate opposed to the pixel electrode array plate and having a second insulating substrate with an electrode formed thereon;

a light modulating layer held between the pixel electrode array plate and the opposed plate, wherein:

each of the scanning lines and the storage capacitor lines is electrically connected to a pad having a projection of an acute-angled plan pattern formed at a location at which the scanning lines and the signal lines do not intersect each other, the projections of the pads of each adjacent pair of the scanning lines and the storage capacitor lines being opposed to each other for allowing discharge of electricity accumulated at the scanning lines and the storage capacitor lines in a state in which the scanning lines and the storage capacitor lines do not contact each other.

7. The display apparatus according to claim 6, wherein:

the projections extend from at least one of:
(1) scanning line connecting pads and storage capacitor line connecting pads formed outside a region in which the pixel electrodes are arranged; and
(2) scanning line inspecting pads and storage capacitor line inspecting pads connected to the scanning line connecting pads and the storage capacitor line connecting pads, respectively.

8. The display apparatus according to claim 7, wherein the projections are constituted by portions of the scanning line connecting pads and the storage capacitor line connecting pads, the portions of each adjacent pair of the scanning line connecting pads and the storage capacitor line connecting pads being opposed to each other for allowing discharge of electricity accumulated at the scanning lines and the storage capacitor lines in a state in which the scanning lines and the storage capacitor lines do not contact each other.

9. The display apparatus according to claim 7, wherein a tip portion of each of the projections has a plan pattern with an acute angle of less than 90°, and the distance between each adjacent pair of the projections is set to 1 μm–20 μm.

10. The display apparatus according to claim 7, wherein the light modulating layer is a liquid crystal layer.

11. A method for manufacturing a display apparatus comprising the steps of:

forming a pixel electrode array plate by forming a pixel electrode array substrate having a plurality of scanning lines and a plurality of storage capacitor lines alternately arranged on a first insulating substrate, forming a plurality of signal lines of a layer differing from a layer which constitutes the scanning lines and the storage capacitor lines, with an insulating film interposed between the layers, such that the signal lines intersect the scanning lines and the storage capacitor lines, and forming a pixel electrode at each intersection of the scanning lines and the signal lines;

opposing a plate with a second insulating substrate having an electrode formed thereon, to the pixel electrode array plate;

holding a light modulating layer between the pixel electrode array plate and the opposed plate; and making each of the scanning lines and the storage capacitor lines electrically connected to a pad which includes a projection of an acute-angled plan pattern formed at a location at which the scanning lines and the signal lines do not intersect each other, the projections of each of the pads of adjacent pair of the scanning lines and the storage capacitor lines being opposed to each other for allowing discharge of electricity accumulated at the scanning lines and the storage capacitor lines in a state in which the scanning lines and the storage capacitor lines do not contact each other.

12. The method according to claim 11, wherein:

the projections extend from at least one of:
(1) scanning line connecting pads and storage capacitor line connecting pads formed outside a region in which the pixel electrodes are arranged; and
(2) scanning line inspecting pads and storage capacitor line inspecting pads connected to the scanning line connecting pads and the storage capacitor line connecting pads, respectively.

13. A display apparatus comprising:

a first electrode plate including a plurality of first electrode lines arranged substantially parallel to each other on a first insulating substrate, and a plurality of pixel electrodes arranged in the form of a matrix and electrically coupled to the first electrode lines via respective switch elements;

a second electrode plate including a second electrode formed on a second insulating substrate and opposed to the pixel electrodes; and a light modulating layer held between the pixel electrodes and the second electrode opposed thereto;

wherein each adjacent pair of the first electrode lines is electrically connected to at least one discharge projection so as to concentrate static electricity between the discharge projections.

14. A display apparatus comprising:

a first electrode plate including a plurality of first electrode lines arranged substantially parallel to each other on a first insulating substrate, and a plurality of pixel electrodes arranged in the form of a matrix and electrically coupled to the first electrode lines via respective switch elements;

a second electrode plate including a second electrode formed on a second insulating substrate and opposed to the pixel electrodes; and a light modulating layer held between the pixel electrodes and the second electrode opposed thereto;

wherein at least one of each adjacent pair of the first electrode lines is electrically connected to at least one discharge projection extending toward the other of the adjacent pair of the first electrode lines.

* * * * *